US011176693B1

(12) United States Patent
Gonzalez-Nicolas et al.

(10) Patent No.: US 11,176,693 B1
(45) Date of Patent: Nov. 16, 2021

(54) RAPID POINT CLOUD ALIGNMENT AND CLASSIFICATION WITH BASIS SET LEARNING

(71) Applicant: Amazon Technologies, Inc., Seattle, WA (US)

(72) Inventors: Javier Romero Gonzalez-Nicolas, Barcelona (ES); Sergey Prokudin, Tubingen (DE); Christoph Lassner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/521,263

(22) Filed: Jul. 24, 2019

(51) Int. Cl.
*G06T 7/50* (2017.01)
*G06T 17/00* (2006.01)
*G06K 9/62* (2006.01)

(52) U.S. Cl.
CPC ............ *G06T 7/50* (2017.01); *G06K 9/6267* (2013.01); *G06T 17/00* (2013.01); *G06T 2207/10028* (2013.01); *G06T 2207/20076* (2013.01); *G06T 2207/20081* (2013.01); *G06T 2207/20084* (2013.01); *G06T 2210/56* (2013.01)

(58) Field of Classification Search
None
See application file for complete search history.

(56) References Cited

U.S. PATENT DOCUMENTS

| | | | |
|---|---|---|---|
| 10,593,042 B1 * | 3/2020 | Douillard | G06K 9/34 |
| 2019/0096086 A1 * | 3/2019 | Xu | G06K 9/00791 |
| 2019/0156507 A1 * | 5/2019 | Zeng | G06K 9/00 |
| 2020/0126208 A1 * | 4/2020 | Ponto | G06T 11/203 |
| 2020/0193619 A1 * | 6/2020 | Danielsson | G06T 7/292 |

* cited by examiner

*Primary Examiner* — James A Thompson
(74) *Attorney, Agent, or Firm* — Pierce Atwood LLP

(57) ABSTRACT

A system configured to process an input point cloud, which represents an object using unstructured data points, to generate a feature vector that has an ordered structure and a fixed length. The system may process the input point cloud using a basis point set to generate the feature vector. For example, for each basis point in the basis point set, the system may identify a closest data point in the point cloud data and store a distance value or other information associated with the closest data point in the feature vector. The system may process the feature vector using a trained model to generate output data, such as performing point cloud registration to generate mesh data, point cloud classification to generate classification data, and/or the like.

20 Claims, 9 Drawing Sheets

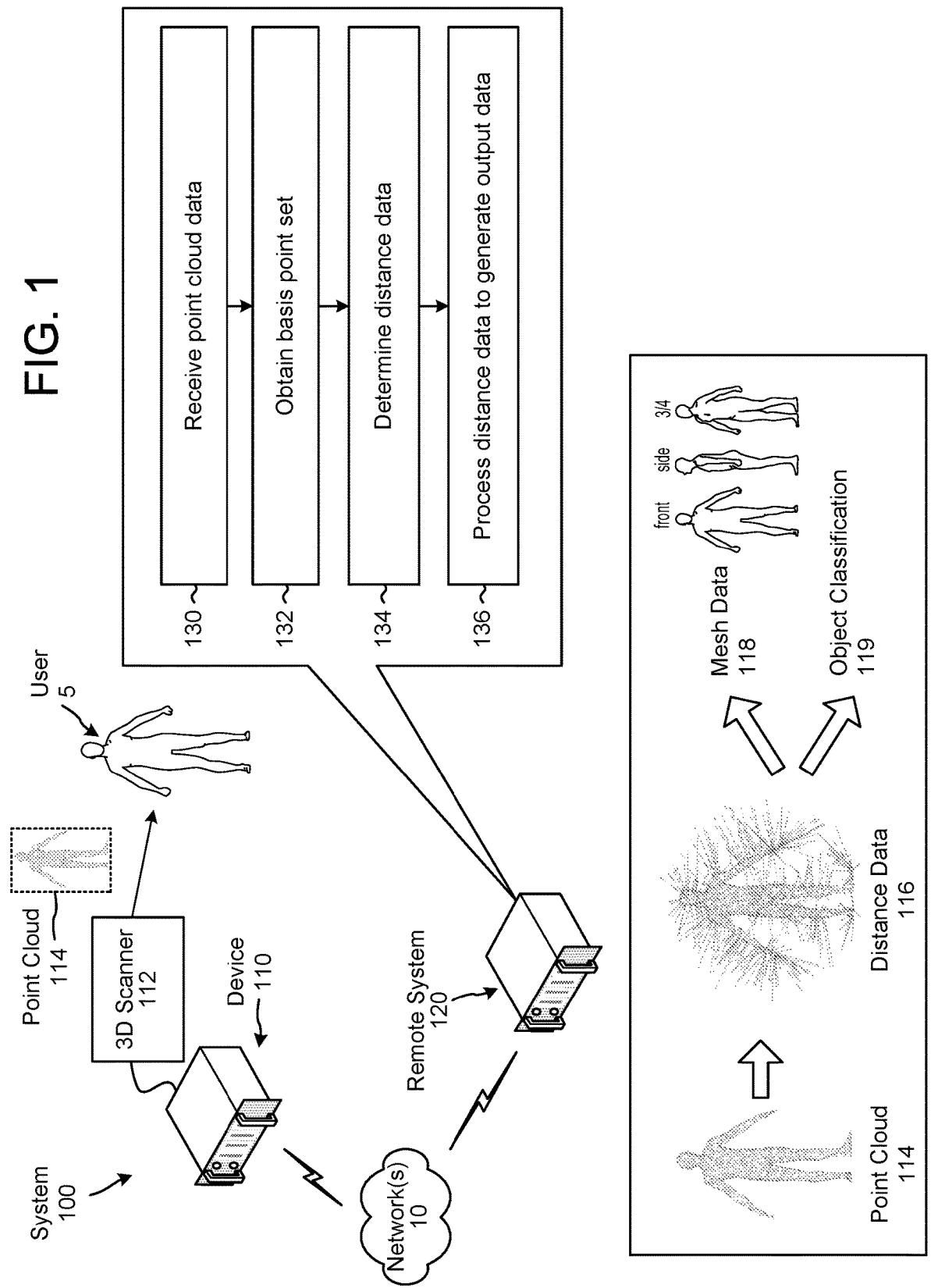

Point Cloud $X = \{x_1, \ldots, x_n\}$
210

Point Cloud $X = \{x_1, \ldots, x_n\}$
210

Fixed Basis Points $B = \{b_1, \ldots, b_k\}^T$
220

Point Cloud $X = \{x_1, \ldots, x_n\}$
210

Fixed Basis Points $B = \{b_1, \ldots, b_k\}^T$
220

Distance Data $D = \{d_1, \ldots, d_k\}^T$
230

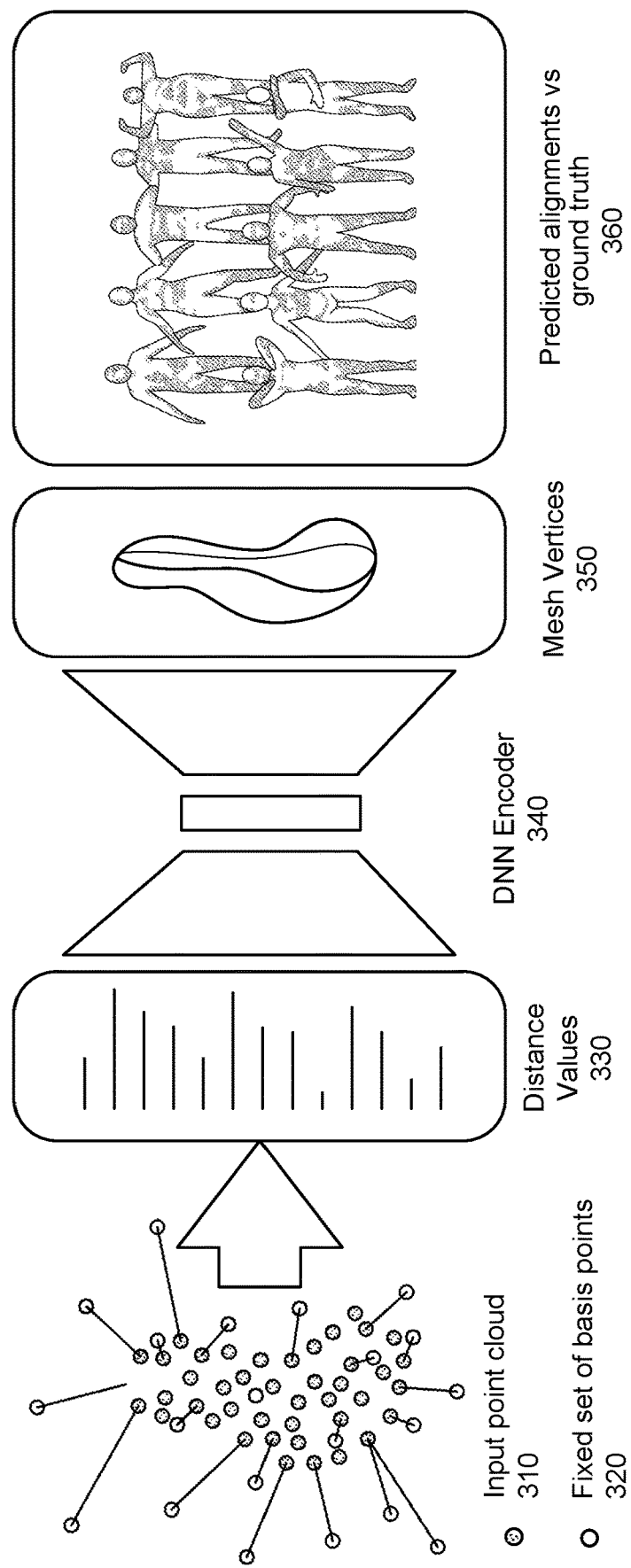

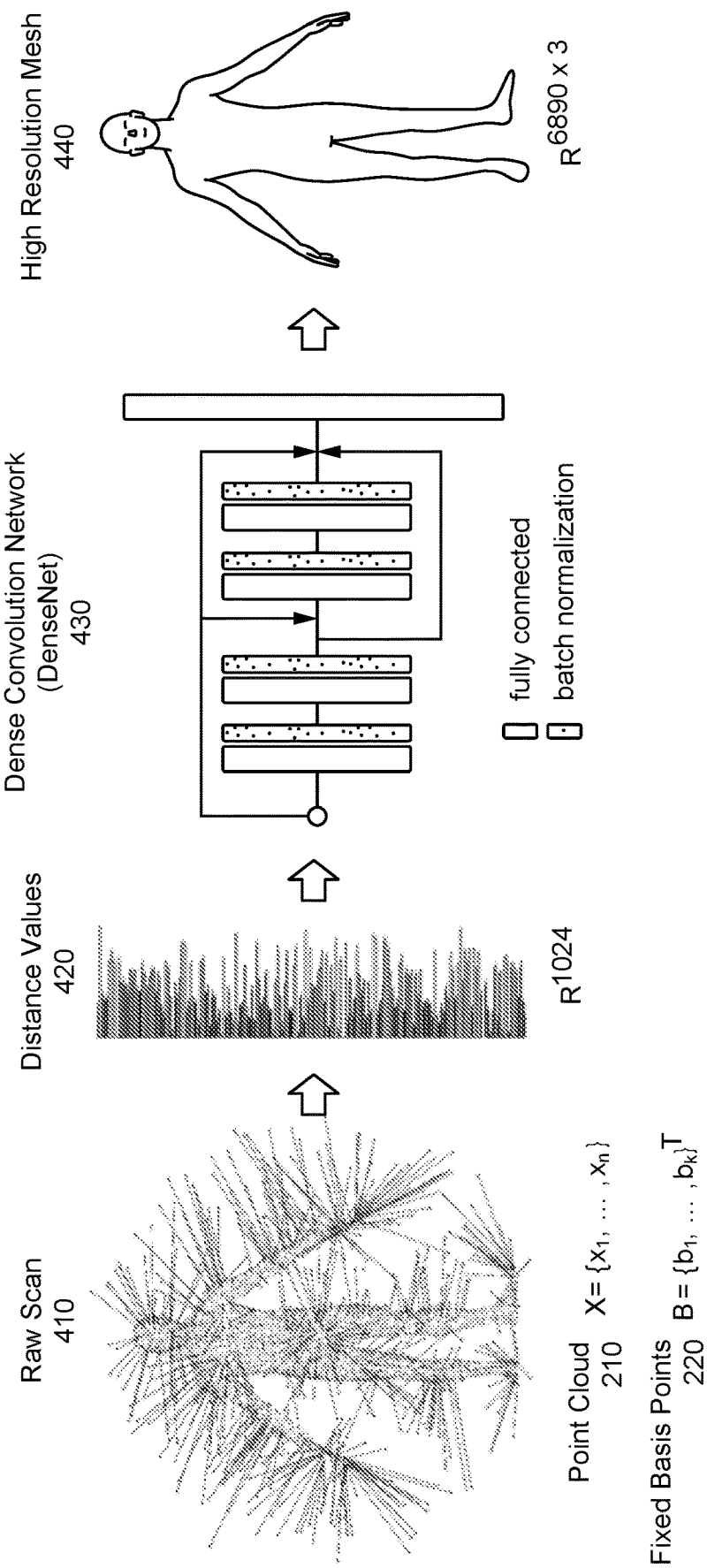

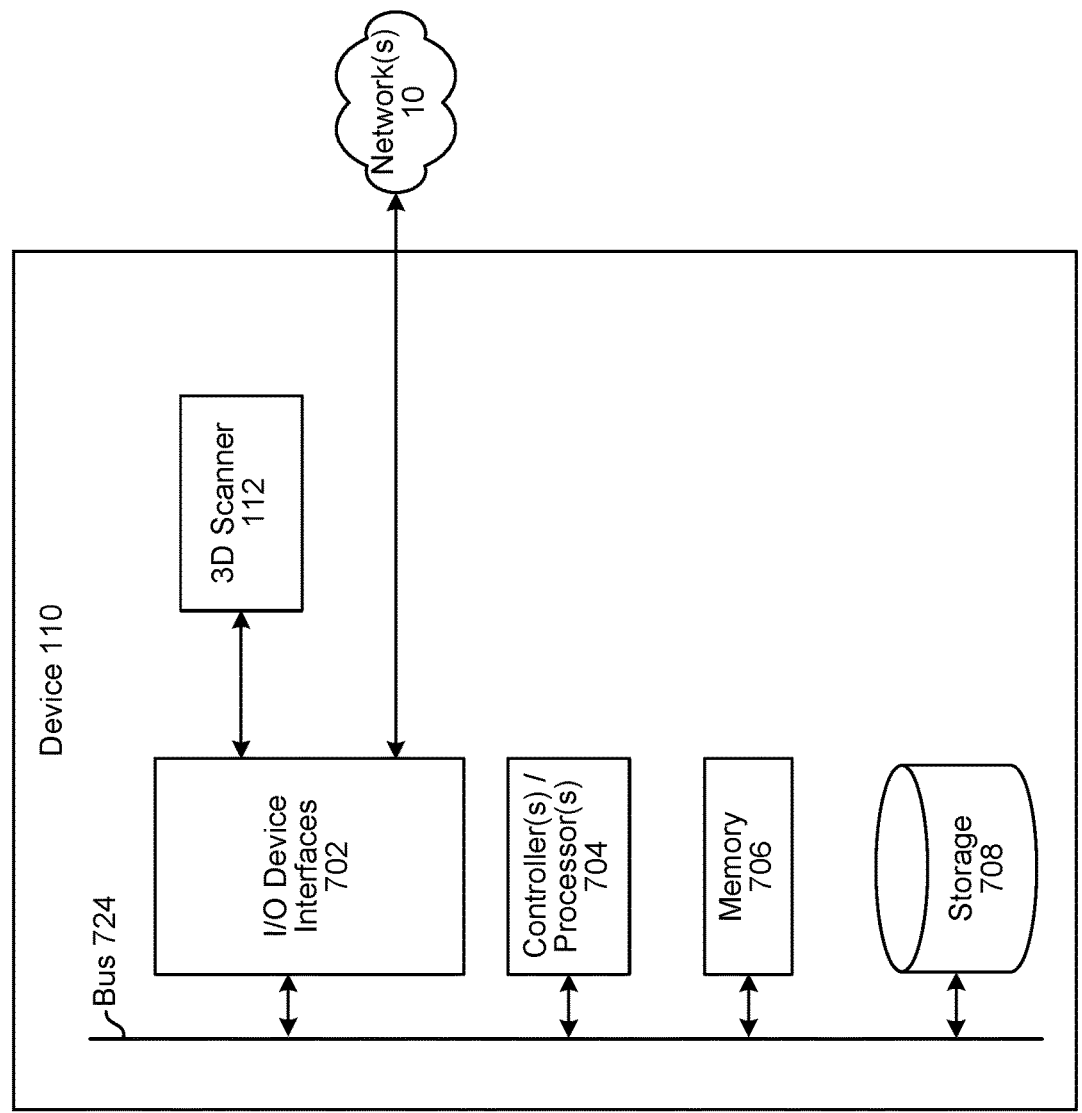

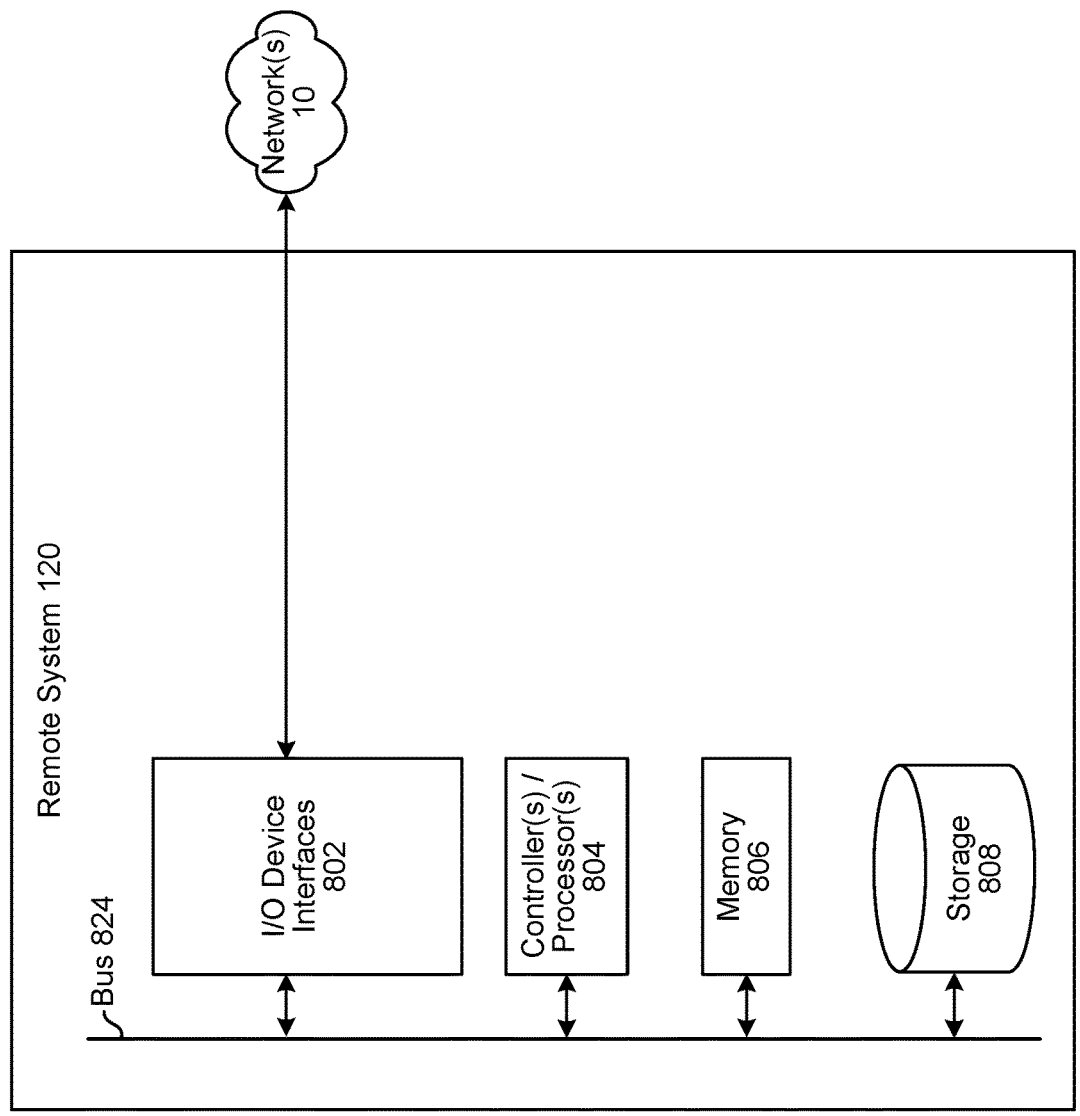

RAPID POINT CLOUD ALIGNMENT AND CLASSIFICATION WITH BASIS SET LEARNING

BACKGROUND

With the advancement of technology, the use and popularity of electronic devices has increased considerably. Electronic devices are commonly used to capture and process image data.

BRIEF DESCRIPTION OF DRAWINGS

For a more complete understanding of the present disclosure, reference is now made to the following description taken in conjunction with the accompanying drawings.

FIG. 1 illustrates a system configured to process point clouds using machine learning algorithms according to embodiments of the present disclosure.

FIG. 3 illustrates an example of point cloud alignment with basis set learning according to embodiments of the present disclosure.

FIGS. 4A-4B illustrate examples of mesh reconstruction according to embodiments of the present disclosure.

FIG. 7 is a block diagram conceptually illustrating example components of a device according to embodiments of the present disclosure.

FIG. 8 is a block diagram conceptually illustrating example components of a remote system according to embodiments of the present disclosure.

DETAILED DESCRIPTION

Figure 2A:
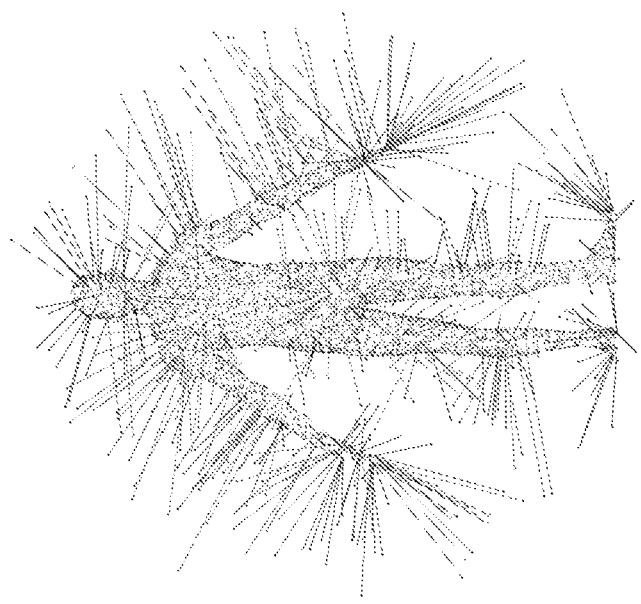
FIGS. 2A-2C illustrate basis set conversion according to embodiments of the present disclosure.

With an increased availability of three-dimensional (3D) scanning technology, point clouds are being used as a rich representation of everyday scenes. However, conventional techniques generate point clouds that are unstructured with a variable number of data points, which can be difficult to process using machine learning algorithms. Some conventional techniques may process the point clouds by applying voxelization, which increases the amount of data stored while at the same time reducing details through discretization. Other conventional techniques may process the point clouds using deep learning models with hand-tailored architectures designed by experts to handle the point clouds directly. However, these architectures use an increased number of parameters and are computationally inefficient.

To improve efficiency, reduce an amount of data, and reduce computational processing required to process point cloud data, devices, systems and methods are disclosed that may process point cloud data using basis point sets. The system may process the point cloud data using a basis point set to generate a feature vector (e.g., distance data) that has an ordered structure with a fixed length. The system may then process the feature vector using a trained model to perform various tasks, such as point cloud registration to generate mesh data, point cloud classification to generate classification data, and/or the like. For each basis point in the basis point set, the system may identify a closest data point in the point cloud data and store a distance value or other information associated with the closest data point in the feature vector.

FIG. 1 illustrates a high-level conceptual block diagram of a system 100 configured to process point clouds using machine learning algorithms according to embodiments of the present disclosure. Although FIG. 1, and other figures/discussion illustrate the operation of the system in a particular order, the steps described may be performed in a different order (as well as certain steps removed or added) without departing from the intent of the disclosure. A plurality of devices may communicate across one or more network(s) 10. For example, FIG. 1 illustrates an example of a device 110 local to a user 5 communicating with a remote system 120 via the network(s) 10.

As illustrated in FIG. 1, the device 110 may include or be communicatively coupled to a three-dimensional (3D) scanner 112 and, after receiving permission from the user 5, the device 110 may perform a 3D scan of the user 5. For example, the device 110 may receive input from the user 5 authorizing the device 110 to use the 3D scanner 112 to generate a point cloud 114 representing the user 5 and the device 110 may then generate the point cloud 114. The point cloud 114 may include a plurality of data points (e.g., n data points) that represent 3D coordinates associated with the user 5. While FIG. 1 illustrates the point cloud 114 corresponding to the user 5, the disclosure is not limited thereto and the point cloud 114 may correspond to an object, object(s), an environment, and/or the like without departing from the disclosure. As used herein, an object may correspond to any material thing that can be seen and touched. Examples of objects include a human, animal (e.g., pet, wild animal, etc.), household object (e.g., furniture, appliance, consumer product, etc.), interior structure (e.g., cabinetry, bookshelf, etc.), outdoor object (e.g., street sign, tree, etc.), exterior structure (e.g., building, shed, etc.), vehicle (e.g., car, motorcycle, etc.), object in proximity to a vehicle (e.g., object in proximity to an autonomous vehicle or drone), and/or the like, although the disclosure is not limited thereto.

The point cloud 114 generated by the 3D scanner 112 has an unordered structure. For example, data points are randomly positioned within the point cloud 114 such that the point cloud 114 may lack i) semantic structure, ii) a known spatial arrangement or context between data points, iii) a notion of neighborhood (e.g., indication of proximity between subsequent data points), and/or the like. In addition, the number of data points included in the point cloud 114 may vary depending on the 3D scanner 112 and/or the user 5, such that a first point cloud 114a may have a first number of data points (e.g., n=10,000) while a second point cloud 114b may have a second number of data points (e.g., n=100,000). For ease of illustration, the point cloud 112 may be referred to as point cloud data, unstructured data, unstructured data points, and/or the like without departing from the disclosure.

As the point cloud 114 is unstructured and may include a variable number of n data points, trained models and/or machine learning algorithms may be unable to process the point cloud 114. The system 100 may be configured to process the point cloud 114 in order to generate structured data that may be ingested by a trained model or machine learning algorithm. For example, the system 100 may use basis point sets (BPS) to process the point cloud 114 with machine learning algorithms. The structured data may include a fixed number of ordered data points (e.g., k data points) at known positions, such that the structured data has i) semantic structure, ii) a known spatial arrangement or context between data points, iii) a notion of neighborhood (e.g., indication of proximity between subsequent data points), and/or the like. For ease of illustration, the structured data may be referred to as structured data, structured data points, distance data, basis point data, fixed basis points, a fixed set of basis points, a basis point representation, and/or the like without departing from the disclosure.

As will be described in greater detail below, the system 100 may process the point cloud 114 to generate the structured data, which is illustrated in FIG. 1 as distance data 116. For example, the device 110 may send the point cloud 114 to the remote system 120 via the network(s) 10 and the remote system 120 may process the point cloud 114 to generate the distance data 116, as described in greater detail below with regard to FIGS. 2A-2C. However, while FIG. 1 illustrates the device 110 sending the point cloud 114 to the remote system 120 and the remote system 120 processing the point cloud 114 to generate the distance data 116, the disclosure is not limited thereto. Instead, the device 110 may process the point cloud 114 locally to generate the distance data 116 and may process the distance data 116 locally and/or optionally send the distance data 116 to the remote system 120 without departing from the disclosure.

As the distance data 116 corresponds to structured data (e.g., has an ordered structure with k data points), it may be ingested by a trained model for further processing. For example, the device 110 and/or the remote system 120 may process the distance data 116 using a trained model to generate output data.

In some examples, the system 100 may perform point cloud registration (e.g., the point cloud 112 is registered to a common template) and generate output data such as mesh data 118, which may correspond to an output mesh, 3D scan, 3D model, deformable model, reposable human avatar, and/or the like. Thus, the mesh data 118 may include detailed geometry and/or color information representing an appearance of the user 5 and may be used to represent the user 5 using 3D surfaces. However, while these terms are closely related, there are slight differences between them and therefore these terms may have a specific meaning. For example, the system 100 may generate depth information corresponding to the point cloud 112 (or a structured data representation of the point cloud 112), which may be referred to as the scan. The system 100 may then perform an alignment process to deform a set of free body vertices (referred to as the mesh) so that they are close to the point cloud 112 (or the structured data representation of the point cloud 112) while also being likely according to a statistical model of human shape and pose. Thus, the scan (e.g., 3D scan) may refer to the depth information, with or without color information, whereas the mesh (e.g., output mesh, 3D model, human avatar) may refer to a deformable model or reposable avatar.

The mesh data 118 has multiple potential applications, including virtual shopping (e.g., virtual try-on), clothing size prediction, avatar extraction for gaming, virtual telepresence, medicine, and/or the like. To illustrate an example of virtual shopping, the user 5 may generate a deformable model or reposable avatar for themselves and use the model/avatar to try on clothing, accessories, footwear, and/or the like. Thus, the system 100 may use the mesh data 118 to assist the user 5 in making a purchasing decision, to suggest (e.g., via a user interface) a size of clothing to the user 5, to represent the user 5 in a virtual environment, to assist renovating or redecorating a room by enabling the user 5 to visualize furniture/objects (e.g., furniture, rugs, paintings, etc.) in a 3D environment. Additionally or alternatively, the system 100 may use the mesh data 118 to assist in navigation without departing from the disclosure. For example, an autonomous vehicle may scan an environment and use the data to identify potential obstacles, perform autonomous navigation, and/or the like. However, the disclosure is not limited thereto and any vehicle may use the mesh data 118 to offer additional functionality without departing from the disclosure.

In other examples, the system 100 may perform point cloud classification (e.g., an object label is inferred from the point cloud 112) and generate output data such as object classification 119, which may correspond to an object label, classification label, point cloud classification, and/or the like and may indicate a classification associated with the point cloud 114 (e.g., human, cat, box, piano, etc.). Thus, the system 100 may identify an object label associated with the point cloud 114 using the distance data 116. However, the disclosure is not limited thereto and the system 100 may process the distance data 116 using any techniques known to one of skill in the art without departing from the disclosure.

The task of navigating a large electronic catalog of items (e.g., a catalog with thousands, millions, or billions of items) to locate items of interest can be burdensome and time consuming for users, especially if the users do not know the names or generic descriptors of the desired items. Typically, the user can locate items by navigating a browse structure, commonly called a "browse tree," in which the items are arranged by category and subcategory. Typically, however, the browse tree includes several levels of categories, requiring the user to navigate through several levels of browse nodes or category pages to arrive at the subcategory of interest. Further, in many cases, the items of interest are not accurately or intuitively categorized, requiring the user to perform additional navigation or keyword searching. Thus, the user frequently has to perform numerous navigational steps to arrive at the catalog page or "item detail page" of interest.

The 3D models determined using the techniques described herein along with associated recommendation algorithms and user interfaces significantly reduce this problem, allowing users to locate items of interest with fewer steps. For example, when the user is presented with one or more item recommendations, each item recommendation includes, or is in the form of, a link to the catalog's item detail page for the corresponding item, allowing the user to navigate directly to this page. Each recommendation thus serves as a programmatically selected navigational shortcut to the item's detail page or description, allowing the user to bypass the navigational structure of the browse tree. Beneficially, programmatically identifying items of interest and presenting the user with navigational shortcuts to these items can improve the speed of the user's navigation through the electronic catalog, rather than requiring the user to page through multiple other pages to locate the recommended items via the browse tree or via searching. This can be particularly true for computing devices with small screens, where fewer items can be displayed to the user at a time and thus navigation of larger volumes of items is more difficult.

The 3D scanner 112 may include a depth sensor (e.g., laser range scanner and/or the like) and may be configured to generate the point cloud 114 using any technique known to one of skill in the art. For example, after receiving permission from the user 5, the 3D scanner 112 may generate the point cloud 114 and the device 110 may receive the point cloud 114 from the 3D scanner 112. While FIG. 1 illustrates the device 110 communicatively coupled to a single 3D scanner 112, the disclosure is not limited thereto and the device 110 may be communicatively coupled to multiple 3D scanners 112 and/or may include an internal 3D scanner 112 without departing from the disclosure. While FIG. 1 illustrates the device 110 generating the point cloud 114 using the 3D scanner 112, the disclosure is not limited thereto and the device 110 may generate the point cloud 114 using any technique known to one of skill in the art without departing from the disclosure. For example, the device 110 may not be connected to the 3D scanner 112 and may instead generate the point cloud 114 using other sensors, such as an image sensor, without departing from the disclosure. Additionally or alternatively, the device 110 may include additional components not illustrated in FIG. 1 without departing from the disclosure.

As illustrated in FIG. 1, the system 100 may receive (130) point cloud data that represents the user 5 or other object using a plurality of three-dimensional data points. For example, after the device 110 receives input from the user 5 authorizing the device 110 to generate the point cloud data, the 3D scanner 112 may generate the point cloud data (e.g., point cloud 114). The device 110 may receive the point cloud data from the 3D scanner 112 and/or the remote system 120 may receive the point cloud data from the device 110 via the network(s) 10. The point cloud data may be unstructured data, as described in greater detail above, with no ordered structure between each of the plurality of data points. Every point cloud can have a different number of points $n_i$:

$$X_i = \{x_{i1}, \ldots, x_{in}\}, x_{ij} \in \mathbb{R}^d \quad [1]$$

where d=3 for the case of 3D point clouds. As part of receiving the point cloud data, the system 100 may optionally normalize the point cloud data to fit a unit sphere:

$$x_{ij} = \frac{x_{ij} - \mathbb{E}_{x_{ij} \sim X_i} x_{ij}}{\max_{x_{ij} \in X_i} \|X_{ij}\|}, \forall i, j. \quad [2]$$

The system 100 may obtain (132) a basis point set with which to process the point cloud 114. For example, the system 100 may generate the basis point set or retrieve a preconfigured basis point set. The basis point set may be a fixed set of k random points that may be selected from a random uniform ball, as shown below.

$$B = [b_1, \ldots, b_k]^T, b_i \in \mathbb{R}^d, \|b_j\| \leq 1 \quad [3]$$

However, the disclosure is not limited thereto and the basis point set may be sampled from a rectangular grid, a ball grid, hexagonal close packing (HCP), and/or other shapes using any technique known to one of skill in the art without departing from the disclosure. Each basis point may be associated with a particular position represented using a three-dimensional coordinate system.

In some examples, the basis point set may be selected from the random uniform ball without further processing, which may be referred to as an unordered basis point set. However, the disclosure is not limited thereto and to improve a performance of a trained model, the system 100 may optionally process the unordered basis point set to introduce a notion of neighborhood or locality, which may be referred to as an ordered basis point set. For example, the system 100 may order the basis points using a k-D tree, such as arranging the points in a k-D tree and sorting them according to leaf indices. As local computations in neural networks over spatially correlated basis points in the feature set benefit from this ordering (e.g., using convolutions or locally connected layers), processing the point cloud data using the ordered basis point set improves a performance of the system 100.

The basis point set is selected once and then fixed for all point clouds in the dataset. The number of random points k included in the basis point set is a hyperparameter that may be used to determine the trade-off between computational complexity and fidelity of the representation. As the basis point set has a fixed number of data points (e.g., k data points), the system 100 may reduce the point cloud data to a fixed-length vector regardless of the variable number of data points included in the point cloud data. The vector length may be adjusted for specific applications and represents a trade-off between fidelity of the encoding and computational efficiency.

Using the basis point set, the system 100 may determine (134) distance data representing minimum distance values between each of the basis points and a nearest point in the point cloud data. In some examples, the system 100 may normalize all data points included in the point cloud data to fit a unit sphere, although the disclosure is not limited thereto. As illustrated in FIG. 1, the system 100 may process the point cloud 114 using the basis point set and determine a plurality of distance values (e.g., distance data 116). For example, the system 100 may identify a first basis point, determine a first data point in the point cloud data that is closest to the first basis point, and determine a first distance value between the first basis point and the first data point. Similarly, the system 100 may identify a second basis point, determine a second data point in the point cloud data that is closest to the second basis point, and determine a second distance value between the second basis point and the second data point.

In some examples, the system 100 may generate a fixed length feature vector for the point cloud data using distance values (e.g., only store a distance value between each basis point and the nearest point in the point cloud data), as illustrated below:

$$x_i^B = \left[ \min_{x_{ij} \in X_i} d(b_1, x_{ij}), \ldots, \min_{x_{ij} \in X_i} d(b_k, x_{ij}) \right]^T, x_i^B \in \mathbb{R}^k \quad [4]$$

where $x_i^B$ is the feature vector, d=3 for 3D point cloud data, $b_i$ denotes a basis point, $x_{ij}$ denotes a data point in the point cloud data, and k denotes the fixed number of basis points.

However, the disclosure is not limited thereto and in other examples, the system 100 may generate the feature vector by storing the nearest point positions (e.g., including additional information about the data points, such as Red-Green-Blue (RGB) values), as illustrated below:

$$X_i^B = \left[ \operatorname*{argmin}_{x_{ij} \in X_i} d(b_1, x_{ij}), \ldots, \operatorname*{argmin}_{x_{ij} \in X_i} d(b_k, x_{ij}) \right]^T, X_i^B \in \mathbb{R}^{k \times d} \quad [5]$$

where $X_i^B$ is the feature vector, $b_i$ denotes a basis point, $x_{ij}$ denotes a data point in the point cloud data, k denotes the fixed number of basis points, and d=3 for 3D point cloud data.

This process corresponds to structured subsampling for the point cloud data: the feature vector will store k points from the original point cloud data closest to the selected basis points in the basis point set. Thus, other information about the data points (e.g., Red-Green-Blue (RGB) values) can be saved as part of the fixed representation. However, the disclosure is not limited thereto and in some examples, the system 100 may only include distance values (e.g., Euclidean distances) in the feature vector without departing from the disclosure. While the above examples are described with regard to Euclidean distances, the disclosure is not limited thereto and other metrics may be used without departing from the disclosure. For example, the system 100 may use data structures like ball trees to perform a nearest neighbor search and identify the nearest data point in the point cloud data without departing from the disclosure.

While the basis point set includes fewer basis points (e.g., k data points) than the point cloud data (e.g., n data points), the distance data 116 represents or encodes the point cloud data with enough fidelity that the system 100 may accurately capture details and perform surface reconstruction of the point cloud data. As the distance data 116 is represented by a fixed length feature vector and the basis points are ordered to give a notion of neighborhood, the distance data 116 can be processed efficiently by a trained model.

The system 100 may process (136) the distance data using a trained model to generate output data. The trained model may be trained to perform different tasks and may be referred to as a trained model, a deep neural network (DNN), and/or machine learning model without departing from the disclosure. In some examples, the trained model may be trained to perform mesh registration (e.g., human point cloud registration) and may generate the mesh data 118, which registers the point cloud data to a common template. For example, the system 100 may perform mesh alignment of noisy 3D scans to predict mesh vertex positions. Thus, the system 100 may generate an aligned high resolution mesh (e.g., mesh data 118) from a noisy scan in a single feed-forward pass with minimal computations, enabling the system 100 to generate the mesh data 118 in real time without additional post-processing steps. In other examples, the trained model may be trained to perform point cloud classification and may generate object classification 119, which indicates an object label inferred from the point cloud data. However, the disclosure is not limited thereto and the system 100 may process the distance data 116 using any techniques known to one of skill in the art without departing from the disclosure.

The trained model and other models described herein, which are implemented by components of the system, may be trained and operated according to various machine-learning techniques. Such techniques may include, for example, neural networks (such as deep neural networks (DNNs) and/or recurrent neural networks (RNNs)), inference engines, and trained classifiers. Examples of trained classifiers include Support Vector Machines (SVMs), neural networks, decision trees, adaptive boosting (AdaBoost) combined with decision trees, and random forests. For example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 2B:
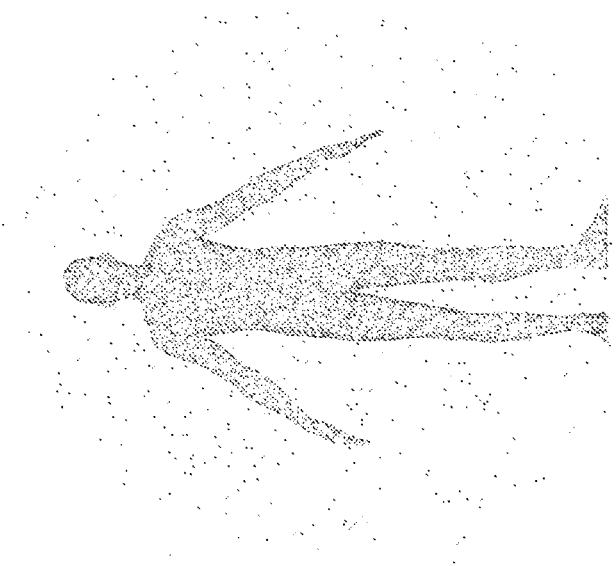
Figure 2C:
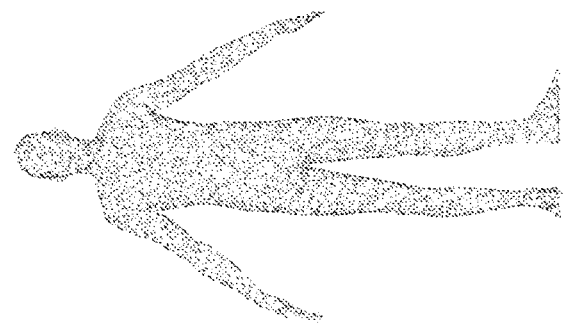

FIGS. 2A-2C illustrate basis set conversion according to embodiments of the present disclosure. As illustrated in FIG. 2A, a point cloud 210 may represent a user 5 and may include a series of n data points (e.g., $X=\{x_1, \ldots, x_n\}$). As illustrated in FIG. 2B, the point cloud 210 may be processed using fixed basis points 220, which include a series of k data points (e.g., $B=\{b_1, \ldots, b_k\}^T$). As illustrated in FIG. 2C, the system 100 may determine distance data 230, which includes a series of k data points (e.g., $D=\{d_1, \ldots, d_k\}^T$). Thus, the system 100 is processing (e.g., approximating) the point cloud 210 using the fixed basis points 220 and determining minimum distance values from each of the basis points included in the fixed basis points 220 to the point cloud 210.

FIG. 3 illustrates an example of point cloud alignment with basis set learning according to embodiments of the present disclosure. As described above with regard to FIG. 1, in some examples the system 100 may generate output data such as mesh data 118, which may correspond to an output mesh, 3D scan, 3D model, deformable model, reposable human avatar, and/or the like. The mesh data 118 may include detailed geometry and/or color information representing an appearance of the user 5 and may be used to represent the user 5 using 3D surfaces.

As illustrated in FIG. 3, the system 100 may process an input point cloud 310 using a fixed set of basis points 320 and generate distance values 330. For example, after receiving permission from the user 5, the system 100 may generate the input point cloud 310 and then process the input point cloud 310 to generate the distance values 330. The system 100 may input the distance values 330 to a deep neural network (DNN) encoder 340, which may process the distance values 330 and generate mesh vertices 350 (e.g., the mesh data 118).

FIG. 3 includes an example of predicted alignments vs. ground truth 360, which illustrates an accuracy of the mesh vertices 350 compared to the original point cloud (e.g., input point cloud 310). For example, the predicted alignments vs. ground truth 360 illustrates portions of the point cloud 310 (e.g., represented as specific data points) interleaved with the mesh vertices 350 (e.g., represented as the outline), indicating that there are only minor differences between the two. Thus, the mesh vertices 350 accurately approximates the input point cloud 310 such that there only small portions of the input point cloud 310 distinguishable from the mesh vertices 350.

FIG. 3 illustrates a simplified example of processing an input point cloud to generate output mesh data. However, to conceptually illustrate a specific implementation, FIG. 4A illustrates a more detailed example of processing an input point cloud to generate output mesh data.

Figure 4B:
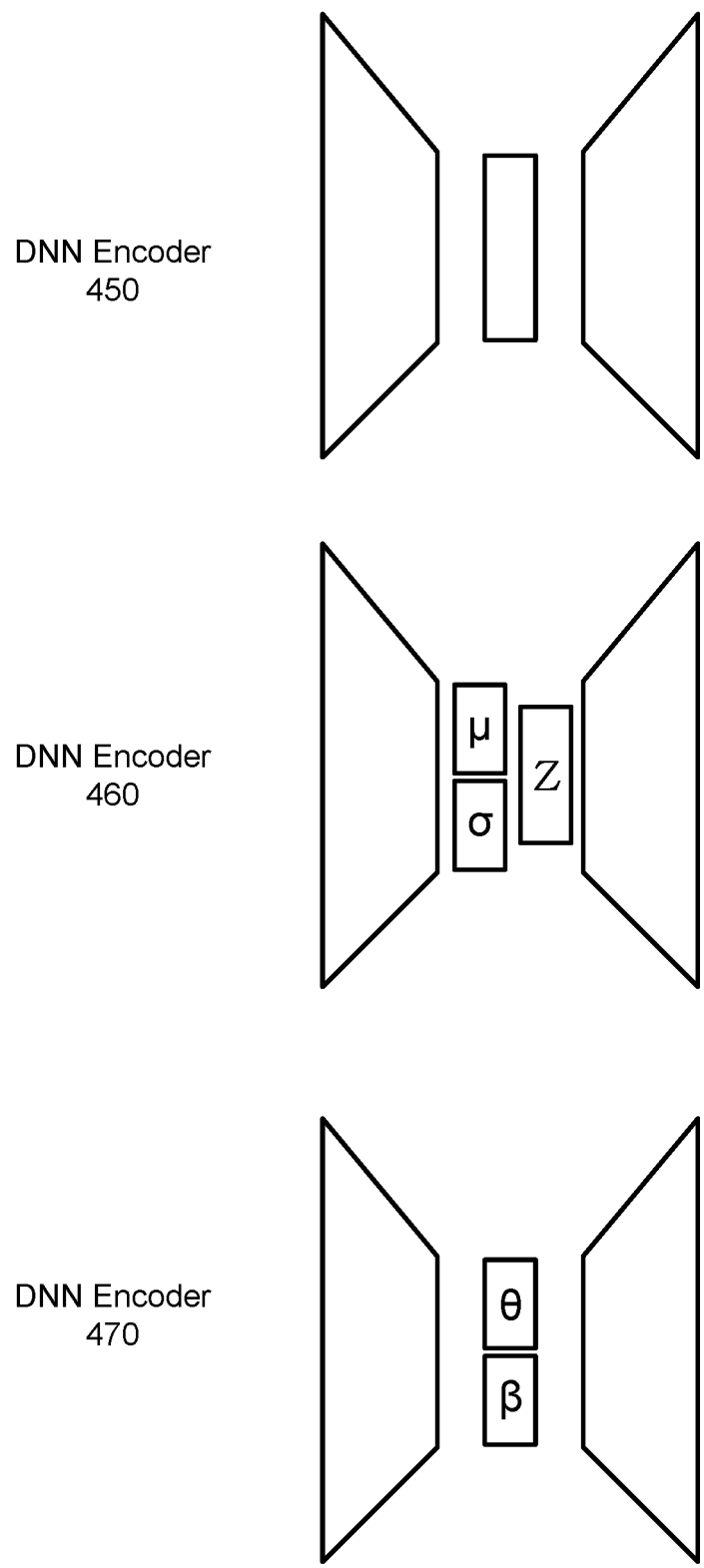

FIGS. 4A-4B illustrate examples of mesh reconstruction according to embodiments of the present disclosure. As illustrated in FIG. 4A, after receiving authorization (e.g., from the user 5 or the person being scanned), the system 100 may perform a raw scan 410 to generate a point cloud 210 (e.g., X={$x_1, \ldots, x_n$}), may process the point cloud 210 using fixed basis points 220 (e.g., B={$b_1, \ldots, b_k$}$^T$) to generate distance values 420, and may process the distance values 420 using a dense convolution network (DenseNet) 430 to generate a high resolution mesh 440.

In the example illustrated in FIG. 4A, the point cloud 210 may include a variable number of data points (e.g., 10,000<n<500,000) and the system 100 may process the point cloud 210 using fixed basis points 220 having a first number of data points (e.g., k=1024). Thus, the distance values 420 may include the first number of data points (e.g., 1024 distance values) and the DenseNet 430 may process the distance values 420 to generate the high resolution mesh 440, which includes a second number of data points (e.g., 6890 data points). Each data point in the high resolution mesh 440 may be represented using three channels, which correspond to a three-dimensional coordinate system (e.g., (x, y, z) coordinates).

While FIG. 4A illustrates the fixed basis points 220 having the first number of data points (e.g., 1024) and the high resolution mesh 440 having the second number of data points (e.g., 6890), this is intended to conceptually illustrate a single example and the disclosure is not limited thereto. For example, the second number of data points is illustrated because many body model templates are configured with 6890 3D data points, with each point indicating a specific position on the human body. However, the disclosure is not limited thereto and the fixed basis points 220 and/or the high resolution mesh 440 may include any number of data points without departing from the disclosure.

FIG. 4A illustrates the DenseNet 430 as including two blocks of two fully connected layers, with fully connected layers represented without shading and bath normalization layers represented with shading. The DenseNet 430 predicts mesh vertex positions using the distance values 420. While FIG. 4A illustrates the trained model as corresponding to the DenseNet 430, the disclosure is not limited thereto and the system 100 may process the distance values 420 using any trained model known to one of skill in the art, including a mu-sigma (μ-σ) model, theta-beta (013) model, and/or the like without departing from the disclosure.

As illustrated in FIG. 4B, the DNN encoder may correspond to a variational encoder and/or generative encoder configured to encode input data (e.g., raw scan 410) to a low-dimensional latent space (e.g., encoded space) representation and then expand the latent space representation to generate output data (e.g., high resolution mesh 440). The latent space representation may be a very compact representation of the input and/or the output, effectively a low-dimensional abstraction of what the system 100 is observing and what it is trying to explain.

To illustrate a simple example, a first DNN encoder 450 is represented by a blank rectangle to indicate that the first DNN encoder 450 encodes the input to a latent space representation to generate the output. To illustrate an example, the first DNN encoder 450 may use mean μ values of the input point cloud data to generate the latent space representation. For example, the system 100 may use the mean μ to generate a random number Z (e.g., latent space representation) that can be processed to generate the output mesh data. Thus, a single point representation in the input point cloud data corresponds to a single point representation in the latent space representation, which is then processed to generate the output data (e.g., single output mesh).

To illustrate another example, FIG. 4B illustrates a second DNN encoder 460 corresponding to the mu-sigma (μ-σ) model, which may calculate both mean μ and variance σ values of the input point cloud data to generate the latent space representation (e.g., Z). For example, the system 100 may use the mean μ and variance σ to generate a random number Z (e.g., latent space representation) that can be processed to generate the output mesh data. Instead of mapping an input to a single output, the second DNN encoder 460 uses the variance σ to map the input to a range of outputs representing multiple possibilities. Thus, the second DNN encoder 460 is generative; instead of a single point representation like the input point cloud data, the latent space representation corresponds to a cloud of points (e.g., multiple data points for each input data point) and the system 100 can process the latent space representation to generate output data based on a selected mean μ and/or variance σ. For example, an input point cloud may be mapped to multiple output meshes having a defined torso but including variations in the legs (e.g., longer, shorter, wider, etc.).

While the first DNN encoder 450 generates a single output mesh, the second DNN encoder 460 may be configured to generate multiple output meshes depending on the parameters chosen for mean μ and variance σ. Additionally or alternatively, the second DNN encoder 460 may be configured to generate a random output mesh. For example, the second DNN encoder 460 may generate a portion of the output mesh (e.g., associated with a specific body part) or an entirely random output mesh that is different from any of the input point clouds To illustrate another example, FIG. 4B illustrates a third DNN encoder 470 corresponding to the theta-beta (θ-β) model, which may be a classical encoder that processes a single input (e.g., input point cloud data) to generate a single output (e.g., output mesh data). However, the third DNN encoder 470 may modify a pose (e.g., θ) and/or shape (e.g., β) of the person represented in the output mesh data. For example, the third DNN encoder 470 may be trained using first training data (e.g., first dataset) representing one person in multiple poses (e.g., different posture, but same height and weight) and second training data (e.g., second dataset) representing multiple people in a single pose (e.g., same posture, but different heights and weights). Thus, the third DNN encoder 470 may be configured to change a shape of the person while maintaining the posture fixed (e.g., represent a person in the same pose while modifying a height or weight of the person) and/or change a pose of the person while maintaining the shape fixed (e.g., reposition or re-pose the person). While the system 100 may reposition or re-pose a person represented in the input cloud data by processing the high resolution mesh 440 using a second trained model (not illustrated), the third DNN encoder 470 may be configured to reposition or re-pose the person as part of generating the high resolution mesh 440.

Additionally or alternatively, while FIG. 4A illustrates the trained model (e.g., DenseNet 430) processing the distance values 420, the disclosure is not limited thereto. Instead, the system 100 may be configured to process image data using a trained model to generate the high resolution mesh 440 without departing from the disclosure. For example, as the system 100 may be configured to process image data using a trained model to generate the distance values 420 directly from the image data, the system 100 may train the trained model to ingest the image data directly, such that the distance values 420 may be inferred but not explicitly generated as part of generating the high resolution mesh 440.

Figure 5:
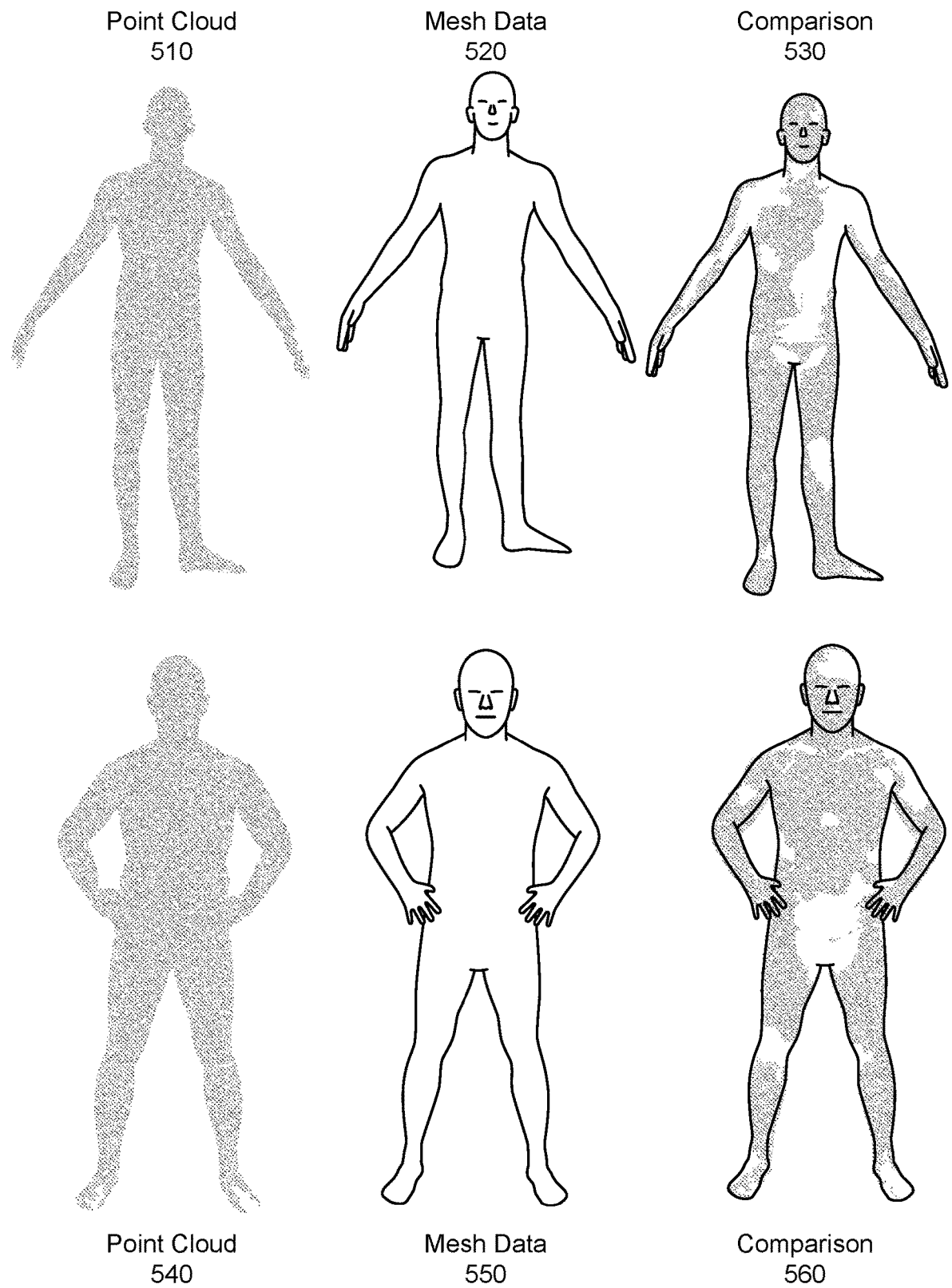
FIG. 5 illustrates examples of point clouds and predicted meshes according to embodiments of the present disclosure.

FIG. 5 illustrates examples of point clouds and predicted meshes according to embodiments of the present disclosure. As illustrated in FIG. 5, the system 100 may process a first point cloud 510 to generate first mesh data 520, with a first comparison 530 illustrating an accuracy of the first mesh data 520 relative to the first point cloud 510. For example, the comparison 530 illustrates the first point cloud 510 (e.g., represented as specific data points) interleaved with the first mesh data 520 (e.g., represented as an outline), indicating that there are only minor differences between the two. Thus, the first mesh data 520 accurately approximates the first point cloud 510 such that there only small portions of the first point cloud 510 distinguishable from the first mesh data 520.

Similarly, the system 100 may process a second point cloud 540 to generate second mesh data 550, with a second comparison 560 illustrating an accuracy of the second mesh data 550 relative to the second point cloud 540. For example, the comparison 560 illustrates the second point cloud 540 (e.g., represented as specific data points) interleaved with the second mesh data 550 (e.g., represented as an outline), indicating that there are only minor differences between the two. Thus, the second mesh data 550 accurately approximates the second point cloud 540 such that there only small portions of the second point cloud 540 distinguishable from the second mesh data 550.

Figure 6:
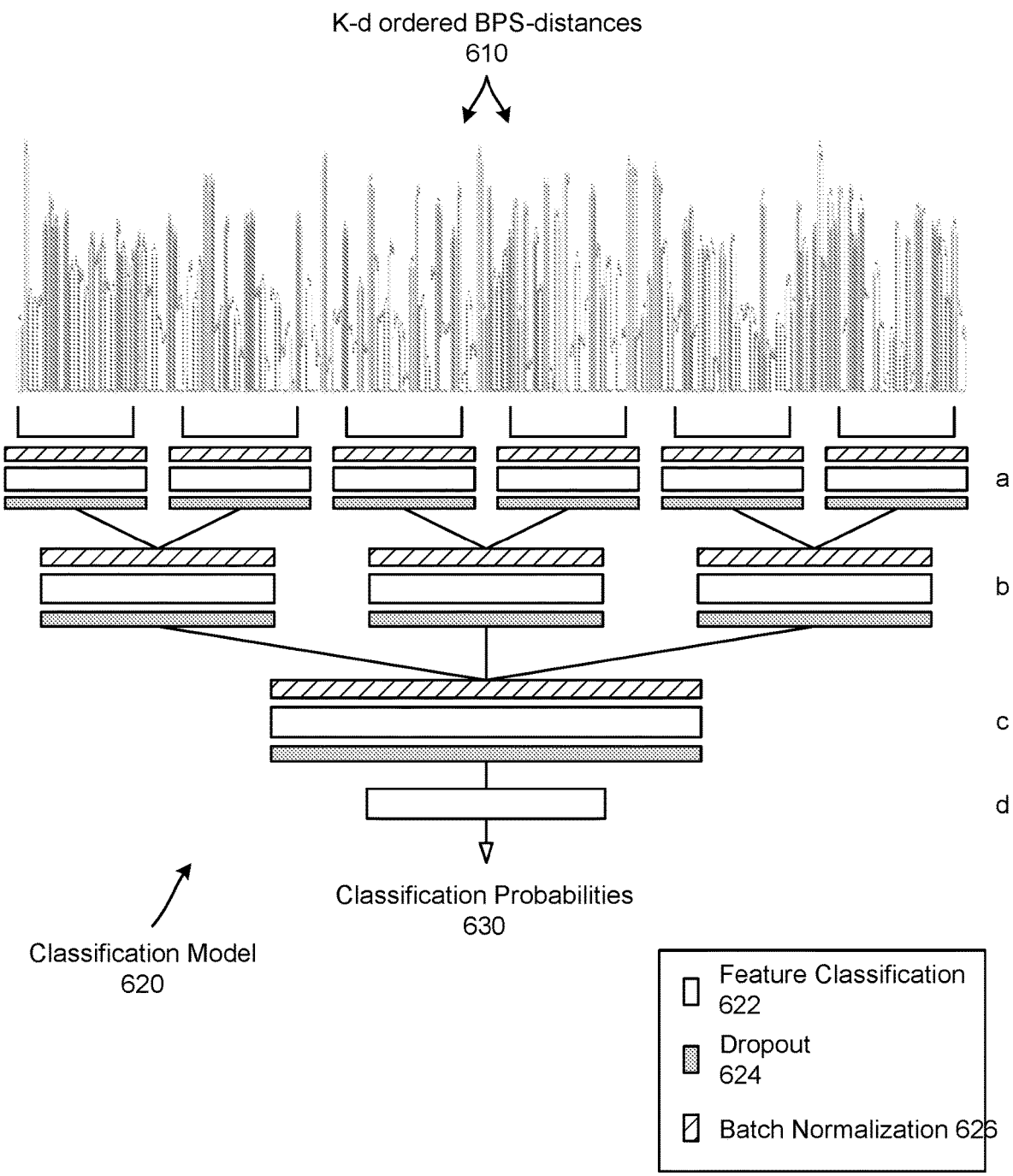
FIG. 6 illustrates an example of a classification network according to embodiments of the present disclosure.

FIG. 6 illustrates an example of a classification network according to embodiments of the present disclosure. In some examples, the system 100 performs point cloud classification and may generate object classification 119, which indicates an object label inferred from the point cloud data. Thus, the object classification 119 may correspond to an object label, classification label, point cloud classification, and/or the like and may indicate a classification associated with the point cloud data (e.g., human, cat, box, piano, etc.).

As illustrated in FIG. 6, the system 100 may process distance data (e.g., K-d ordered BPS-distances 610) using a classification model 620 to generate classification probabilities 630, which indicates the object label associated with the point cloud data input to the system 100. The classification model 620 may process groups of BPS-distances block-wise according to the kd-ordering of the basis points. The classification model 620 may correspond to a network consisting of blocks of one-dimensional (1D) locally connected layers. Each of the convolutions may be followed by rectified units, dropout, and batch normalization layers.

In the example illustrated in FIG. 6, the classification model 620 includes four layers (a-d), such that a first layer a includes six blocks, a second layer b includes three blocks, a third layer c includes one block, and a fourth layer d only includes a single layer. Each block comprises a feature classification layer 622, a dropout layer 624, and a batch normalization layer 626.

The classification model 620 may output a plurality of classification probabilities 630 that indicates a likely classification for the input point cloud data. For example, if there are 100 potential classification labels, the classification probabilities 630 may include 100 separate values indicating a probability value corresponding to each class. The system 100 may identify a highest probability value and determine a corresponding classification label to associate with the input point cloud data.

FIG. 7 is a block diagram conceptually illustrating a device 110 that may be used with the system. FIG. 8 is a block diagram conceptually illustrating example components of a remote device, such as the remote system 120, which may assist with processing input image data and/or generating output data. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers may be included in the remote system 120. In operation, each of these devices (or groups of devices) may include computer-readable and computer-executable instructions that reside on the respective device (110/120), as will be discussed further below.

Each of these devices (110/120) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120) may also include a data storage component (708/808) for storing data and controller/processor-executable instructions. Each data storage component (708/808) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (702/802).

Computer instructions for operating each device (110/120) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120) includes input/output device interfaces (702/802). A variety of components may be connected through the input/output device interfaces (702/802), as will be discussed further below. Additionally, each device (110/120) may include an address/data bus (724/824) for conveying data among components of the respective device. Each component within a device (110/120) may also be directly connected to other components in addition to (or instead of) being connected to other components across the bus (724/824).

Referring to FIG. 7, the device 110 may include input/output device interfaces 702 that connect to a variety of components such as a 3D scanner 112, image sensor (not illustrated), and/or other component(s) capable of generating image data and/or point cloud data. The device 110 may additionally include a display (not illustrated) for displaying content, although the disclosure is not limited thereto.

The input/output device interfaces 702 may connect to one or more networks 10 via a wired and/or wireless connection. Examples of wired connections may include Ethernet, a local area network (LAN), and/or the like. Examples of wireless connections may include a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. Through the network(s) 10, the system 100 may be distributed across a networked environment. The I/O device interface (702/802) may also include communication components that allow data to be exchanged between devices such as different physical servers in a collection of servers or other components.

The components of the device 110 and the remote system 120 may include their own dedicated processors, memory, and/or storage. Alternatively, one or more of the components of the device 110 and the remote system 120 may utilize the I/O interfaces (702/802), processor(s) (704/804), memory (706/806), and/or storage (708/808) of the device(s) 110 and remote system 120, respectively.

As noted above, multiple devices may be employed in a single system. In such a multi-device system, each of the devices may include different components for performing different aspects of the system's processing. The multiple devices may include overlapping components. The components of the device 110 and the remote system 120, as described herein, are illustrative, and may be located as a stand-alone device or may be included, in whole or in part, as a component of a larger device or system.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:

receiving a plurality of unstructured data points representing an object, the plurality of unstructured data points including a first data point at a first position in a three-dimensional (3D) coordinate system and a second data point at a second position in the 3D coordinate system, the plurality of unstructured data points lacking organization between the first data point and the second data point;

determining a plurality of structured data points with which to compare the plurality of unstructured data points, the plurality of structured data points including a third data point at a third position in the 3D coordinate system and a fourth data point at a fourth position in the 3D coordinate system, the plurality of structured data points having a known spatial arrangement between the third data point and the fourth data point;

determining, using the plurality of unstructured data points and the plurality of structured data points, a first feature vector for the plurality of unstructured data points, wherein the determining the first feature vector comprises:

determining that the third data point corresponds to a first element in the first feature vector, determining a first distance value between the third position and the first position, determining a second distance value between the third position and the second position, determining that the first distance value is lower than the second distance value, indicating that the first data point is nearest to the third data point of the plurality of unstructured data points, and storing the first distance value in the first element in the first feature vector; and processing, using a first neural network, the first feature vector to generate output data corresponding to a three-dimensional (3D) model of the object.

2. The computer-implemented method of claim 1, further comprising:

processing, using a second neural network, the first feature vector to generate second output data that includes a plurality of probability values including a first probability value;

determining that the first probability value is highest of the plurality of probability values;

identifying a first classification label of a plurality of classification labels that corresponds to the first probability value; and associating the first classification label with the object.

3. The computer-implemented method of claim 1, wherein the processing further comprises:

processing, using the first neural network, the first feature vector to generate output data corresponding to the 3D model of the object in a first pose that is different from a second pose represented by the plurality of unstructured data points.

4. The computer-implemented method of claim 1, further comprising:

receiving a second plurality of unstructured data points representing a second object, the second plurality of unstructured data points including a fifth data point at a fifth position in the 3D coordinate system;

determining, using the second plurality of unstructured data points and the plurality of structured data points, a second feature vector for the second plurality of unstructured data points, a first element in the second feature vector indicating a third distance value between the third position and the fifth position, indicating that the fifth data point is nearest to the third data point of the second plurality of unstructured data points; and training the first neural network using the first feature vector and the second feature vector.

5. A computer-implemented method, the method comprising:

receiving point cloud data representing an object, the point cloud data including a first data point at a first position in a three-dimensional (3D) coordinate system;

determining basis point data with which to compare the point cloud data, the basis point data including a first number of data points that include a second data point at a second position in the 3D coordinate system and a third data point at a third position in the 3D coordinate system;

determining, using the point cloud data and the basis point data, a plurality of distance values, wherein the determining further comprises:

determining, using the first data point and the second data point, a first distance value corresponding to a first distance from the second position to the first position, determining that the first distance value represents a first minimum distance from the second position to one of a plurality of data points in the point cloud data, determining, using the third data point, a second distance value representing a second minimum distance from the third position to one of the plurality of data points in the point cloud data, and determining the plurality of distance values, the plurality of distance values having the first number of data points and including the first distance value and the second distance value; and processing, using a first model, the plurality of distance values to generate output data.

6. The computer-implemented method of claim 5, wherein the processing further comprises:

processing, using the first model, the plurality of distance values to generate output data that indicates a first classification label of a plurality of classification labels, the first classification label corresponding to the object.

7. The computer-implemented method of claim 5, wherein the processing further comprises:

processing, using the first model, the plurality of distance values to generate output data that includes a 3D model representing the object.

8. The computer-implemented method of claim 5, wherein the processing further comprises:

processing, using the first model, the plurality of distance values to generate output data that includes a 3D model representing the object in a first pose that is different from a second pose represented by the point cloud data.

9. The computer-implemented method of claim 5, wherein determining the plurality of distance values further comprises:

determining a first distance value between the second position and the first position;

determining a third distance value between the second position and a fourth position associated with a fourth data point included in the point cloud data;

determining that the first distance value is smaller than the third distance value;

determining that the first data point is closest to the second data point of a plurality of data points included in the point cloud data; and associating the first distance value with the second data point.

10. The computer-implemented method of claim 5, further comprising:

generating, using the plurality of distance values, a first feature vector, a first element of the first feature vector corresponding to the first distance value;

receiving second point cloud data representing a second object, the second point cloud data including a fourth data point at a fourth position in the 3D coordinate system;

determining, using the second point cloud data and the basis point data, a second plurality of distance values, the second plurality of distance values including a third distance value corresponding to a second distance between the fourth position and the second position;

generating, using the second plurality of distance values, a second feature vector, a first element of the second feature vector corresponding to the third distance value; and training the first model using the first feature vector and the second feature vector.

11. The computer-implemented method of claim 5, further comprising:

generating, using the plurality of distance values, a feature vector, a first value in the feature vector including first coordinates representing the first position associated with the first data point, wherein processing the plurality of distance values further comprises processing, using the first model, the feature vector to generate the output data.

12. The computer-implemented method of claim 5, wherein the point cloud data includes a variable number of unstructured data points that lack organization, and the basis point data includes a fixed number of structured data points having a known spatial arrangement sampled from a random uniform ball.

13. A system comprising:
at least one processor; and
memory including instructions operable to be executed by the at least one processor to cause the system to:
receive point cloud data representing an object, the point cloud data including a first data point at a first position in a three-dimensional (3D) coordinate system;
determine basis point data with which to compare the point cloud data, the basis point data including a second data point at a second position in the 3D coordinate system;
determine, using the point cloud data and the basis point data, a plurality of distance values, the plurality of distance values including a first distance value corresponding to a first distance from the second position to the first position; and
process, using a first model, the plurality of distance values to generate output data,
wherein the point cloud data includes a variable number of unstructured data points that lack organization, and the basis point data includes a fixed number of structured data points having a known spatial arrangement.

14. The system of claim 13, wherein the memory further comprises instructions that, when executed by the at least one processor, further cause the system to:
process, using the first model, the plurality of distance values to generate output data that indicates a first classification label of a plurality of classification labels, the first classification label corresponding to the object.

15. The system of claim 13, wherein the memory further comprises instructions that, when executed by the at least one processor, further cause the system to:
process, using the first model, the plurality of distance values to generate output data that includes a 3D model representing the object.

16. The system of claim 13, wherein the memory further comprises instructions that, when executed by the at least one processor, further cause the system to:
process, using the first model, the plurality of distance values to generate output data that includes a 3D model representing the object in a first pose that is different from a second pose represented by the point cloud data.

17. The system of claim 13, wherein the memory further comprises instructions that, when executed by the at least one processor, further cause the system to:
determine a first distance value between the second position and the first position;
determine a second distance value between the second position and a third position associated with a third data point included in the point cloud data;
determine that the first distance value is smaller than the second distance value;
determine that the first data point is closest to the second data point of a plurality of data points included in the point cloud data; and
associate the first distance value with the second data point.

18. The system of claim 13, wherein the memory further comprises instructions that, when executed by the at least one processor, further cause the system to:
generate, using the plurality of distance values, a first feature vector, a first element of the first feature vector corresponding to the first distance value;
receive second point cloud data representing a second object, the second point cloud data including a third data point at a third position in the 3D coordinate system;
determine, using the second point cloud data and the basis point data, a second plurality of distance values, the second plurality of distance values including a second distance value corresponding to a second distance between the third position and the second position;
generate, using the second plurality of distance values, a second feature vector, a first element of the second feature vector corresponding to the second distance value; and
train the first model using the first feature vector and the second feature vector.

19. The system of claim 13, wherein the memory further comprises instructions that, when executed by the at least one processor, further cause the system to:
generate, using the plurality of distance values, a feature vector, a first value in the feature vector including first coordinates representing the first position associated with the first data point,
wherein processing the plurality of distance values further comprises processing, using the first model, the feature vector to generate the output data.

20. A computer-implemented method, the method comprising:
receiving point cloud data representing an object, the point cloud data including a first data point at a first position in a three-dimensional (3D) coordinate system;
determining basis point data with which to compare the point cloud data, the basis point data including a second data point at a second position in the 3D coordinate system;
determining a first distance value corresponding to a first distance from the second position to the first position;
determining a second distance value corresponding to a second distance from the second position to a third position associated with a third data point included in the point cloud data;
determining that the first distance value is smaller than the second distance value;
determining that the first data point is closest to the second data point of a plurality of data points included in the point cloud data;
associating the first distance value with the second data point;
determining, using the point cloud data and the basis point data, a plurality of distance values, the plurality of distance values including the first distance value; and
processing, using a first model, the plurality of distance values to generate output data.

* * * * *